March 12, 1946.  D. P. MEIGS  2,396,469
CLOSURE FOR HIGH PRESSURE VESSELS
Filed March 16, 1944
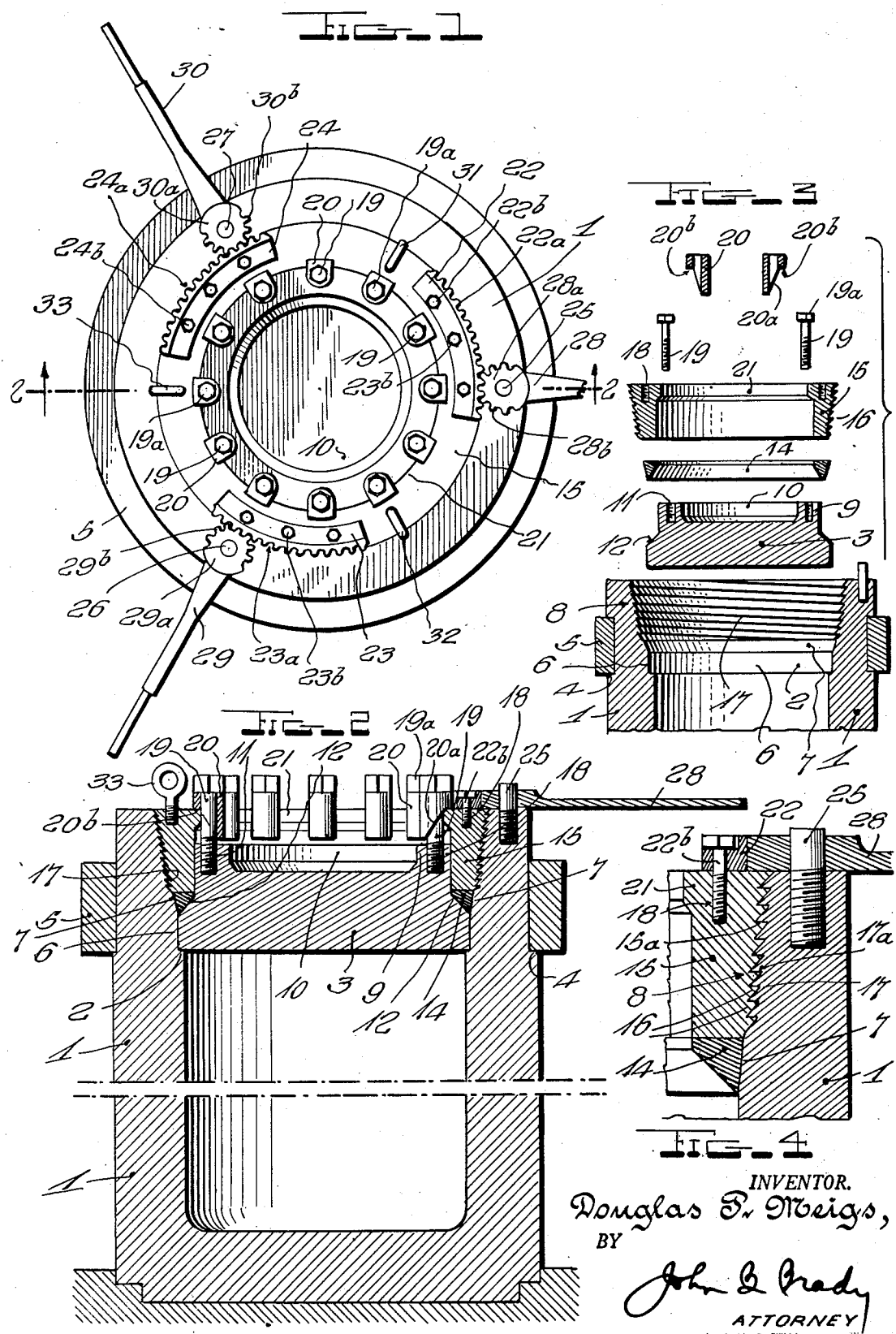
INVENTOR.
Douglas P. Meigs,
BY
John B. Brady
ATTORNEY Patented Mar. 12, 1946

2,396,469

UNITED STATES PATENT OFFICE 2,396,469

CLOSURE FOR HIGH-PRESSURE VESSELS

Douglas P. Meigs, Silver Spring, Md., assignor to American Instrument Company, Silver Spring, Md., a partnership Application March 16, 1944, Serial No. 526,757

7 Claims. (Cl. 220—46)

My invention relates broadly to high pressure vessels and more particularly to a construction of self-sealing closure for very large openings in high pressure vessels.

One of the objects of my invention is to provide an improved construction of self-sealing closure for very large openings in high pressure vessels, the design and form being such as to permit opening and closing the pressure vessel with a minimum of trouble and with a minimum of superstructure extraneous to the basic design of pressure vessels.

Another object of my invention is to provide a simple arrangement which will enable great force to be applied to the making up of the closure with a minimum of human energy and without cumbersome and costly auxiliary structure.

Another object of my invention is to provide a design of closure which will require a minimum of material to be used for an opening in a high pressure vessel of given size and pressure.

Another object of my invention is to provide a type of construction in which the transfer of stresses from end thrust to wall stress shall be as uniform and direct as possible.

Another object of my invention is to provide a closure of such design that the warpage and distortion resulting from prolonged stress at high temperatures will have a minimum of deleterious effect upon the facility of opening and closing the pressure vessel, and at the same time such that the machined surfaces in contact shall be relatively free from galling.

These objectives are accomplished by a modification of the Bridgman type of closure, using tapered threads, and facilitated by an arrangement of geared levers, as described and set forth in detail in the specification hereinafter following, by reference to the accompanying drawing, in which:

Figure 1 is a plan view of the high pressure vessel with the closure applied thereto; Fig. 2 is a vertical sectional view through the high pressure vessel showing the closure in position, the view being foreshortened for purposes of showing the closure on a reasonably large scale; Fig. 3 is a view illustrating the parts of the closure in disassembled superimposed relation preparatory for sealing the closure; and Fig. 4 is an enlarged view showing the tapered thread employed between the body of the pressure vessel and the sleeve which retains the sealing ring between the body and head of the vessel for carrying the end thrust due to internal pressure and illustrating a fragmentary portion of the gear means employed for moving the sealing ring to sealing position.

It is well known that for high pressure vessels of any appreciable size, the use of ordinary flanges is cumbersome, and as the pressure becomes greater and the size of the opening increased, this becomes more critical. It is also well known that considerable savings in weight, size and cost obtain at pressures over a few thousand p. s. i. by the use of closures operating on Bridgman's principle of the unsupported area to make them self-sealing. However, a serious obstacle to the use of this closure for very large openings, say over two feet diameter, is that it becomes quite difficult to screw the thrust sleeve in and out of the body, because of the high torque required. An alternative sometimes used is to provide a flange ring with a set of huge bolts to carry the thrust, so that the problem of disassembly will not be too great. This has the disadvantage of increased weight again. Another serious drawback to the use of threads for such work is that after prolonged service at high temperatures they frequently freeze tight, and of course with large diameter threads of relatively fine pitch, disassembly becomes hopeless.

My invention is directed to an arrangement which provides a modification of the Bridgman type of closure using an unsupported area for self-sealing purposes that will be applicable to large openings and will provide a maximum of freedom from galling after high temperature service, will require a minimum of time and effort for frequent disassembly and re-sealing, will use a minimum of material in its construction, and will be low in cost, considering the above requirements.

The basic feature of my invention is the use of a tapered thread between the body of the pressure vessel and the sleeve which retains the sealing ring between the body and head and carries the end thrust due to internal pressure and special means for moving the head to sealing position. By this device, the following results are obtained:

(1) When assembling the closure, the sleeve may be lowered into position over the head and into the mouth of the pressure vessel with ease. Because of the nature of identical conical surfaces, the sleeve is self aligning, and no effort is required to see that the threads properly engage. After the sleeve is lowered as far as it will go without rotation, a few turns are sufficient to engage all of the threads between the two parts. The clearance between the male and female threads is large, but decreases as the sleeve is turned in, so that rotation is free and easy until the last few degrees of movement. It is only necessary for the sleeve to be approximately in line, in order that it may be turned in by hand with very little effort. After this steel sleeve (which may be several feet in diameter and weighing a few hundred pounds), has been turned up "finger-tight," if geared levers are slipped over pivots on the rim of the opening, a moment's effort by two or three men will lock the sleeve firmly in position. Then the clamping sleeves and tightening bolts are inserted in position and pulled up tight to make the initial seal of the closure sufficient to hold it until internal pressure is applied.

(2) In disassembling the unit, after pressure is released and generous amounts of penetrating oil are applied, the clamping bolts are first loosened and backed off a few threads. Then steel drift bars are placed on the rim of the head between the clamps, and a few heavy blows with sledgehammers are struck simultaneously to jar the head from its seal and relieve pressure on the under surface of the sleeve. The latter then is freed by use of the geared levers combined with a few jarring blows on the outside of the rim of the pressure vessel. As soon as free, the sleeve is easily backed out against the clamps, and they are again pulled up, thus freeing the gasket completely and lifting the head off its seat. More penetrating oil is poured in around the head to lubricate the gasket space completely, the head is allowed to settle again, a chainfall is hooked into a sling through the eyebolts in the retaining sleeve, and the latter is unscrewed a few turns, pulling up on the chainfall all the time. As soon as the tapered threads disengage, the sleeve is lifted out of the opening and set aside. The chainfall may now be used to lift the head and gasket out of the opening, thereby leaving the latter unobstructed. By the use of tapered threads on the thrust bearing sleeve, all possibility of galling these threads is eliminated, and the difficult task of unscrewing a heavy threaded cylindrical sleeve that may have been burned and distorted by prolonged stress at high temperatures is reduced to a minimum.

Referring to the drawing in detail, reference character 1 designates the body of the vessel recessed at 2 to provide an internal annular shoulder seat for the head 3. The vessel has an external annular seat 4 formed thereon for receiving the reinforcing ring 5 which prevents distortion of the vessel by the particularly high pressure around the sealing ring 14. The vessel 1 is provided with an internal cylindrical wall portion 6 which extends vertically from the annular shoulder or seat 2 to an outwardly tapered surface 7 which connects with the tapered internal threaded section 8.

The head 3 has a reduced section projecting therefrom as represented at 9 internally recessed as shown at 10 providing an upwardly extending annular ledge which contains screw threaded pockets disposed at spaced intervals as represented at 11. The upwardly projecting portion 9 of the head connects with the lower portion of the head through an annular inclined wall represented at 12. The annular inclined wall 12 aligns and registers with the tapered surface 7 in the body of the vessel and between these oppositely inclined annular faces a hard sealing ring 14 is disposed. The hard sealing ring 14 has a tapered section as illustrated in the drawing with a flat upper face upon which the externally tapered sleeve 15 is arranged to bear. The tapered sleeve 15 is provided with external tapered threads indicated at 16 adapted to engage and coact with the threads 17 formed in the tapered internally threaded section 8 in body 1.

The tapered sleeve 15 is provided with a plurality of spaced screw-threaded sockets 18 for receiving the securing bolts represented at 22b, 23b and 24b (Fig. 1). Tightening bolts 19 provided with hexagonal heads represented at 19a for engagement by a securing tool, enter head 3 as shown in Figs. 2 and 4. The bolts pass through clamping sleeves represented at 20 engaging the inwardly directed annular flange portion 21 of the tapered sleeve 15 as shown in the drawing. The clamping sleeves are tubular in shape and are cut on a bias as represented at 20a providing a shoulder 20b which projects over the annular flange 21 of the tapered sleeve 15.

The top face of the tapered sleeve 15 carries the three spaced sectors represented at 22, 23 and 24, each of which is provided with radially extending gear teeth formed on the external periphery thereof as represented at 22a, 23a and 24a. The sectors are secured to the upper face of the tapered sleeve 15 by means of bolts 22b, 23b and 24b. The upper peripheral edge of the body 1 constituting the vessel is provided with upwardly extending pin or pivot members represented at 25, 26 and 27 over which hand lever members shown at 28, 29 and 30 may be slipped. These hand lever members each have apertured heads represented at 28a, 29a and 30a which have gear teeth 28b, 29b and 30b formed thereon for engaging and coacting with the teeth 22a, 23a and 24a on the sectors 22, 23 and 24, respectively. The pivots or pins 25, 26 and 27 are so located with respect to the approximate ends of the toothed sectors when the tapered sleeve has been turned to "finger-tight" position that practically the entire length of the sector is available for forcing the tapered sleeve to firm and secure position, the required displacement being produced by relative movement of the toothed heads 28a, 29a and 30a with respect to the coacting sectors. After the tapered sleeve has been forced to a firm position under action of the hand levers 28, 29 and 30, the tightening bolts 19 are then turned to clamping position and tightened.

The cumulative effect afforded by the individual flat spiral faces 15a of the threads formed on the frusto-conical threaded sleeve 15 in coaction with the flat spiral faces 17a of the tapered threads 17 in the top of the vessel 1, builds up a rigid abutment for the head 3 which will withstand extremely heavy pressures within the body 1. The sleeve 15 is provided with eyebolts represented at 31, 32 and 33 for facilitating its setting and removal with respect to the body of vessel 71. Similar eyebolts may be provided in head 3 for facilitating lifting and replacement of the head with respect to the shoulder of the vessel 1.

While I have described my invention in one of its preferred embodiments, I realize the modifications and changes in construction may be made and I intend no limitations upon my invention other than may be imposed by the scope of the appended claims.

What I claim as new and desire to secure by Letters Patent of the United States, is as follows:

1. A closure for high pressure vessels comprising a receptacle having a recessed opening constituting an annular shoulder seat for receiving a closure head therein in sealing engagement with the annular shoulder seat, tapered screw threads formed internally adjacent the end of said receptacle, a thrust bearing sleeve having tapered screw threads thereon coacting with the tapered screw threads on said receptacle, and clamping means extending internally of said sleeve and engaging the interior peripheral edge of said thrust bearing sleeve and said closure head for locking said sleeve and said head into sealed relation to said vessel.

2. A closure for high pressure vessels comprising a receptacle having a recessed end constituting an annular shoulder seat, a closure head insertable into the recessed end of said receptacle in sealing engagement with the annular shoulder seat, said closure head having an integrally connected portion of reduced section and said receptacle having tapered screw threads in the end thereof approximately adjacent the reduced section of said closure head, a tapered sleeve having tapered screw threads thereon engageable with the tapered screw threads on said receptacle, said sleeve being rotatable between said receptacle and the reduced section of said closure head, and clamping means extending internally of said sleeve and engaging the interior peripheral edge thereof and connected with said closure head for maintaining said closure head in sealed position in said receptacle.

3. A closure for high pressure vessels comprising a receptacle having a recessed opening adjacent one end thereof, said recess including a cylindrical zone, smooth walled tapered zone connected thereto, a tapered screw-threaded zone with said tapered zone, a closure including a cylindrical head forming sealing engagement with the cylindrical zone of the recessed opening and having an end portion of reduced section projecting therefrom, an angularly disposed annular surface interconnecting said cylindrical head and the end portion of reduced section, a sealing ring of tapered section disposed intermediate the smooth walled tapered zone in said receptacle and the angularly disposed annular surface of said head, a tapered sleeve having tapered screw threads thereon engageable with the tapered screw threaded zone in said receptacle and operative to abut against said sealing ring for forcing said sealing ring into intimate contact with the surface of said smooth walled tapered zone of said receptacle and the angularly disposed annular surface of said head for sealing said receptacle against high internal pressures.

4. A closure for high pressure vessels comprising a receptacle having a recessed opening constituting an annular shoulder seat for receiving a closure head therein, tapered screw threads formed internally adjacent the end of said receptacle, a thrust bearing sleeve having tapered screw threads thereon coacting with the tapered screw threads on said receptacle, a sealing ring having a flat bearing face engageable by said thrust bearing sleeve and having a pair of tapered faces engageable with said receptacle and with said closure head, and a multiplicity of screw devices disposed at spaced intervals peripherally of said sleeve and adjustably connected with said head for exerting pressure through said sealing ring and establishing sealing engagement between said closure head and said receptacle.

5. A closure for high pressure vessels comprising a receptacle having a recessed opening constituting an annular shoulder seat for receiving a closure head therein, tapered screw threads formed internally adjacent the end of said receptacle, a thrust bearing sleeve having tapered screw threads thereon coacting with the tapered screw threads on said receptacle, a sealing ring intermediate one end of said thrust bearing sleeve and said closure head, a multiplicity of lug members engageable with the internal periphery of said sleeve, and adjustable screw devices extending through said lug members and engageable in said head for exerting pressure between said thrust ring sleeve and said tapered head and through said sealing ring for establishing sealing engagement between said head and said receptacle.

6. A closure for high pressure vessels comprising a receptacle having a recessed opening constituting an annular shoulder seat, a smooth walled cylindrical portion connected therewith, a smooth walled tapered zone extending therefrom and a tapered screw-threaded zone connected therewith, a closure head insertable into the recessed opening of said receptacle, said head having a circular section engageable against the annular shoulder seat, a reduced cylindrical section projecting therefrom, a smooth tapered wall interconnecting said circular section and said reduced section, a sealing ring having a flat annular bearing surface and a pair of coacting tapered surfaces disposed intermediate said head and said receptacle with the tapered surfaces thereof bearing respectively against the smooth walled tapered zone of said recessed opening and the smooth tapered wall of said closure head, a tapered sleeve having tapered screw threads thereon engageable with the tapered screw-threaded zone of said receptacle and operative to abut against the flat bearing surface of said sealing ring for forcing said sealing ring into sealing engagement between said closure head and said receptacle, clamping sleeves shaped to engage the interior peripheral edge of said tapered sleeve, bolt members extending through said clamping sleeves and secured in an annular row in the reduced cylindrical section of said closure head for establishing a pressure seal between said screw-threaded tapered sleeve, said sealing ring and said closure head, and symmetrically arranged gear means for annularly adjusting the position of said screw-threaded tapered sleeve with respect to said receptacle before said clamping sleeves are tightened under control of said bolt members.

7. A closure for high pressure vessels comprising a receptacle having a recessed opening constituting an annular shoulder seat, a smooth walled cylindrical portion connected therewith, a smooth walled tapered zone extending therefrom and a tapered screw-threaded zone connected therewith, a closure head insertable into the recessed opening of said receptacle, said head having a circular section engageable against the annular shoulder seat, a reduced cylindrical section projecting therefrom, a smooth tapered wall interconnecting said circular section and said reduced section, a sealing ring having a flat annular bearing surface and a pair of coacting tapered surfaces disposed intermediate said head and said receptacle with the tapered surfaces thereof bearing respectively against the smooth tapered wall of said recessed opening and the smooth walled tapered zone of said closure head, a tapered sleeve having tapered screw threads thereon engageable with the tapered screw-threaded zone of said receptacle and operative to abut against the flat bearing surface of said sealing ring for forcing said sealing ring into sealing engagement between said closure head and said receptacle, clamping sleeves shaped to engage the interior peripheral edge of said tapered sleeve, and bolt members extending through said clamping sleeves and secured in an annular row in the reduced cylindrical section of said closure head for establishing a pressure seal between said screw-threaded tapered sleeve, said sealing ring and said closure head.

DOUGLAS P. MEIGS.